(12) United States Patent
Romero

(10) Patent No.: US 8,344,726 B2
(45) Date of Patent: Jan. 1, 2013

(54) ACOUSTIC MODIFIED NMR (AMNMR)

(75) Inventor: Pedro A. Romero, Rio de Janeiro (BR)

(73) Assignee: Baker Hughes Incorporated, Houston, TX (US)

( * ) Notice: Subject to any disclaimer, the term of this patent is extended or adjusted under 35 U.S.C. 154(b) by 544 days.

(21) Appl. No.: 12/370,404

(22) Filed: Feb. 12, 2009

(65) Prior Publication Data

US 2010/0201358 A1   Aug. 12, 2010

(51) Int. Cl.
*G01V 3/00* (2006.01)
(52) U.S. Cl. .................. 324/303; 324/309
(58) Field of Classification Search ............ 324/300, 324/303, 306, 309; 702/7, 9, 11, 13
See application file for complete search history.

(56) References Cited

U.S. PATENT DOCUMENTS

| | | | |
|---|---|---|---|
| 6,163,153 A | 12/2000 | Reiderman et al. | |
| 6,348,792 B1 | 2/2002 | Beard et al. | |
| 6,459,262 B1* | 10/2002 | Wisler et al. | 324/303 |
| 6,755,246 B2 | 6/2004 | Chen et al. | |
| 6,841,996 B2* | 1/2005 | Madio et al. | 324/303 |
| 6,933,719 B2* | 8/2005 | Thomann et al. | 324/303 |
| 6,956,371 B2* | 10/2005 | Prammer | 324/303 |
| 7,082,994 B2 | 8/2006 | Frost, Jr. et al. | |
| 7,301,337 B2* | 11/2007 | Beard | 324/303 |
| 7,301,338 B2 | 11/2007 | Gillen et al. | |
| 7,486,070 B2* | 2/2009 | Madio et al. | 324/303 |
| 7,808,238 B2* | 10/2010 | Chen | 324/303 |
| 7,825,659 B2* | 11/2010 | Georgi et al. | 324/303 |
| 2003/0006767 A1 | 1/2003 | Georgi et al. | |
| 2008/0221800 A1* | 9/2008 | Gladkikh et al. | 702/11 |

OTHER PUBLICATIONS

I. A. Beresnev et al.; "Elastic-wave stimulation of oil production: A review of methods and results," Geophysics vol. 59, No. 6 (Jun. 1994); pp. 1000-1017.
H. T. O'Neil; Theory of Focusing Radiators, The Journal of the Acoustical Society of America, vol. 21, No. 5, Sep. 1949, pp. 516-526.
I. Chilibon et al.; "Ultrasound Underwater Transducer for Extracorporeal Shock Wave Lithotripsy (ESWL)," Romanian Reports in Physics, vol. 57, No. 4, 2005, pp. 979-992.

* cited by examiner

*Primary Examiner* — Brij Shrivastav
(74) *Attorney, Agent, or Firm* — Mossman Kumar & Tyler PC

(57) ABSTRACT

Many reservoirs of interest include heavy oil. In such reservoirs, NMR measurements have difficulty distinguishing between heavy oil and water in the formation. An acoustic signal is used to modify the relaxation time distribution of water and heavy oil in opposite directions and thus increase the separability of the distributions.

13 Claims, 3 Drawing Sheets

ACOUSTIC MODIFIED NMR (AMNMR)

BACKGROUND OF THE DISCLOSURE

1. Field of the Disclosure

The disclosure is in the field of wellbore logging devices. Specifically, the disclosure is a method of acoustically stimulating the rock formation to improve the quality of data about rock formations in nuclear magnetic resonance techniques for determining relaxation rates.

2. Description of the Related Art

Almost all the current well-logging instruments are designed to detect the in-situ fluid and/or formation properties without deliberately altering the environmental states, such as temperature, pressure, etc, of the formation and fluids. In principle, keeping the formation and fluids in their native state is a desirable choice in normal situations. However, because a tool is more sensitive to operation under certain conditions, there are situations where the quality of the measurements will improve if one changes the environmental state of the formation and fluids. As long as the modification does not create adverse effects on the subject formation and fluids, and as long as the change of environment is reversible after the apparatus of modification is removed, measurements taken at the modified state are also valid, and experiments can be designed to be taken at the more favorable, altered state of the formation. This disclosure is about designing a tool which changes the environment and makes subsequent measurements, resulting in a more effective characterization of formation properties. Moreover, certain practices such as the heat produced by drilling change the environment temporarily. If an instrument response is more sensitive at a higher temperature, it will be desirable to measure the properties before the drilling induced heat is dissipated. It may also be beneficial to make measurements at different temperatures.

Many petroleum reservoirs in Canada, Venezuela, China, and other countries contain highly viscous oils. Most of the heavy-oil reservoirs are relatively shallow subsurface ones, where the formation water is often fresh, i.e., low in salinity. The lack of conductivity contrast between fresh water and hydrocarbon makes it difficult to quantify hydrocarbon saturations using the resistivity-based and induction-based logging techniques.

NMR and dielectric-based techniques are fundamentally different in the identification of fluid types and quantification of saturations; thus, they are complementary to resistivity-based technique. However, heavy oils present challenges in current NMR logging techniques. The state-of-art NMR logging tool can distinguish water (wetting phase) and hydrocarbon (non-wetting phase) only if their corresponding intrinsic and/or apparent relaxation times pose a significant contrast between the two types of reservoir fluids.

NMR responses are different, depending on whether the reservoir fluids are inside porous rocks or outside. For bulk, liquid-phase fluids, NMR response depends on viscosity and temperature:

$$T_{1bulk} \text{ or } T_{2bulk} = \frac{A \cdot T}{T_0 \cdot \eta}, \qquad \text{Eq. (1)}$$

where A is a fluid-type dependent quantity and differs by a factor of about 2-3 between oil and water, T and $T_0$ are the absolute temperatures in Kelvin at reservoir and ambient conditions, respectively, and $\eta$ is the viscosity. For water at room temperature, $\eta \approx 1$ cP. On the other hand, heavy oil viscosity is typically two (or more) orders of magnitude higher than that of water at the same temperature.

Although the bulk fluid relaxation time contrast appears useful in distinguishing heavy oil from bulk water, it may not be so useful if the fluids are inside porous rocks. In a rock, one must take into account additional relaxation mechanism arising from the interaction between pore surface and fluids in the pore:

$$T_1^{-1} = T_{1bulk}^{-1} + \rho \frac{S}{V} \qquad \text{Eq. (2)}$$

$$T_2^{-1} = T_{2bulk}^{-1} + \rho \frac{S}{V}$$

where S/V is the pore-surface-to-pore-volume ratio and $\rho$ is the surface relaxivity which depends strongly on the wetting characteristics between the fluid and surface of pores. Depending on how large the relaxivity value, $\rho$, is, the apparent relaxation times could be either dominated by the bulk ($1^{st}$ term in eq. (2)) or surface ($2^{nd}$ term in eq. (2)) relaxation rate. For the majority of reservoirs, water is the wetting phase and oil is the non-wetting one. In this case, the apparent relaxation time of water is dominated by the surface relaxation mechanism, resulting in a much faster apparent relaxation decay than its bulk relaxation produces. Because the surface relaxation time term depends on S/V, the apparent relaxation time is even shorter for smaller sized pores and clays. The water in the smaller pores and clays often associates with water that is irreducible, often known as BVI and CBW. Although the mechanism for shortening the apparent relaxation times are different for heavy oil and CBW and BVI water, the result is that they overlap each other, and it is often difficult to separate heavy oil from these irreducible water by the difference of their relaxation times.

For most viscous oils, the intrinsic $T_2$ is too short for most NMR logging tools to detect. The failure to detect these fastest decaying $T_2$ components results in an underestimation of the porosity of the oil-bearing formation. U.S. Pat. No. 6,755,246 to Chen et al. having the same assignee as the present disclosure teaches the use of passive or active heating to elevate the temperature of the fluids in the formation. At elevated temperatures, distinguishing between heavy oil and bound water is easier. Of particular interest is the increase in the resolvability of the transverse relaxation time $T_2$ of NMR spin echo measurements. As can be seen from eq. (1), the relaxation times of oils are proportional to temperature. The viscosity, on the other hand, decreases with temperature. Thus, the relaxation time increases with temperature in the rate higher than linear temperature dependence. As most of the heavy oil reservoirs are shallow, the reservoir temperature is low. For example, a significant amount of heavy oil such as the Athabasca tar sands of Canada and the tar deposits of the Orinoco Belt in Venezuela occur at shallow depths. For those reservoirs, underestimation of porosity for the viscous oil sands is highly likely.

The present disclosure is directed towards another method of reversibly altering formation conditions to increase the separation of heavy oil and water.

SUMMARY OF THE DISCLOSURE

One embodiment of the disclosure is a method of identifying a presence of two fluid components in an earth formation. The method includes acquiring first nuclear magnetic resonance (NMR) signals from a region of examination of an earth formation; generating an acoustic wave into the region of examination and acquiring second NMR signals; and identifying the presence of the two fluids by using a difference between the first NMR signals and the second NMR signals.

Another embodiment of the disclosure is an apparatus configured to identify a presence of two fluid components in an earth formation. The apparatus includes a nuclear magnetic resonance (NMR) tool configured to acquire first and second NMR signals from a region of examination of an earth formation, an acoustic source configured to generate an acoustic wave into the region of examination during acquisition of the second NMR signals, and a processor configured to identify the presence of the two fluids using a difference between the first NMR signals and the second NMR signals.

Another embodiment of the disclosure is a computer-readable medium accessible to a processor. The computer-readable medium includes instructions which enable the processor to identify a presence of two fluid components in an earth formation, using a difference between first nuclear magnetic resonance (NMR) signals from a region of examination of the earth formation and second NMR signals acquired in the presence of an acoustic wave in the region of examination.

BRIEF DESCRIPTION OF THE DRAWINGS

The present disclosure is best understood with reference to the accompanying figures in which like numerals referred to like elements and in which.

DESCRIPTION OF EMBODIMENT

Figure 1:
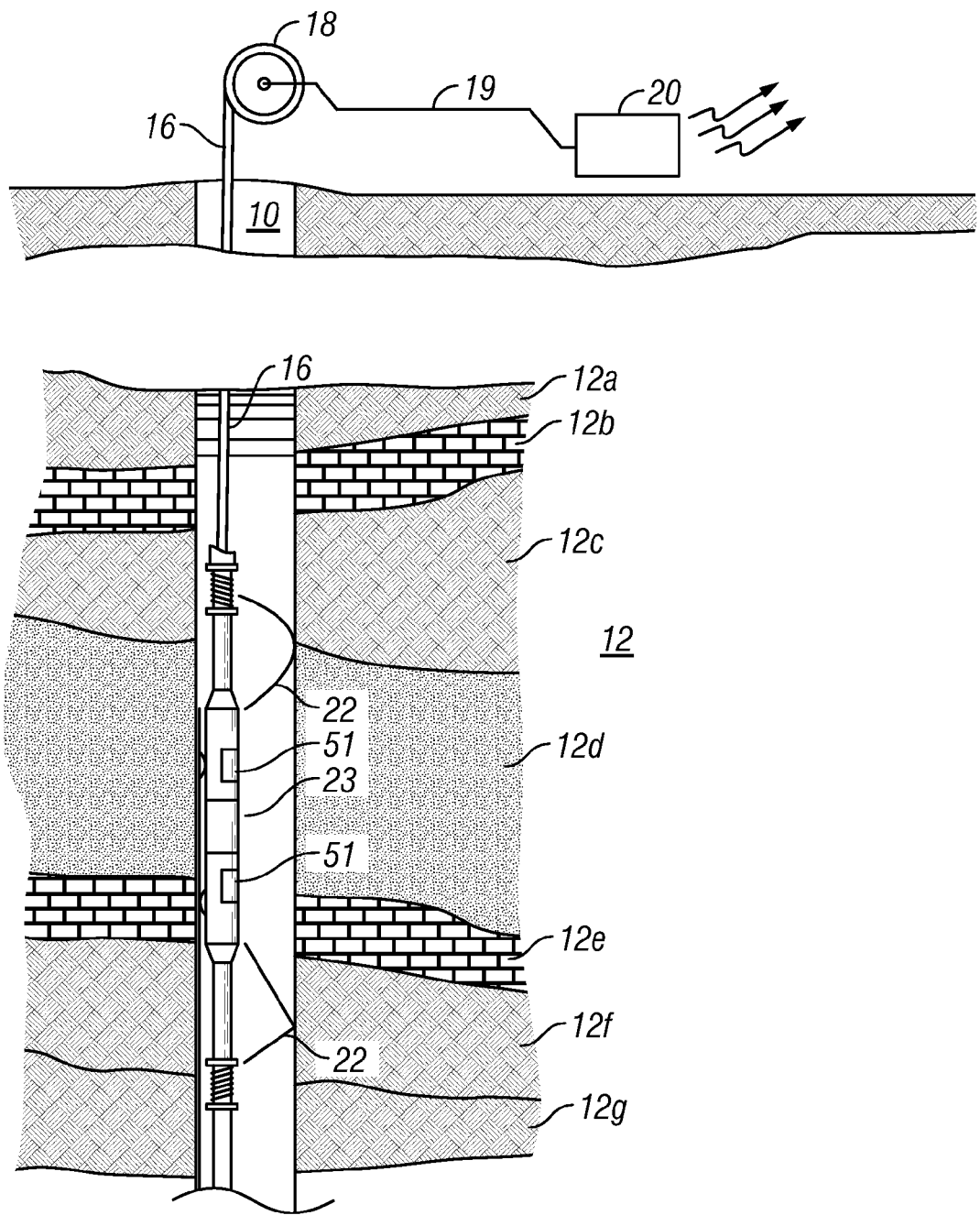
FIG. 1 illustrates a downhole tool suitable for use with the present disclosure.

FIG. 1 depicts a borehole 10 which has been drilled in a typical fashion into a subsurface geological formation 12 to be investigated for potential hydrocarbon producing reservoirs. An NMR logging tool 23 has been lowered into the hole 10 by means of a cable 16 and appropriate surface equipment represented diagrammatically by a reel 18 and is being raised through the formation 12 comprising a plurality of layers 12a through 12g of differing composition, to log one or more of the formation characteristics. The NMR logging tool is provided with bowsprings 22 to maintain the tool in an eccentric position within the borehole with one side of the tool in proximity to the borehole wall. The magnet configuration is that of a line dipole. Signals generated by the tool 23 are passed to the surface through the cable 16 and from the cable 16 through another line 19 to appropriate surface equipment 20 for processing, recording and/or display or for transmission to another site for processing, recording and/or display. The tool also includes two acoustic signal generators labeled as 51. The function of these signal generators is discussed further below. Other NMR tools may also be used. For example, U.S. Pat. No. 6,348,792 to Beard et al., having the same assignee as the present disclosure and the contents of which are incorporated herein by reference, discloses a side-looking NMR logging tool including a permanent magnet arrangement having a magnetization direction oriented towards a side of the tool and a dipole RF antenna displaced towards the front of the tool. The magnet arrangement produces a shaped region of investigation in front of the tool wherein the magnetic field has a uniform field strength and the RF field has a uniform field strength in a direction orthogonal to the static field. The shaping of the static field is accomplished by the magnet arrangement comprising a plurality of magnets having parallel magnetization or by a single shaped magnet. The antenna arrangement includes a gapped core made of non-ferritic soft material for increasing the antenna efficiency. The magnet arrangement also reduces ringing in the core and the antenna. An optional RF shield is used to reduce NMR signals from borehole fluids.

The present disclosure deals with the phenomenon calls the acoustically modified NMR (AMNMR). In an exemplary prior art AMNMR method, formation permeability is calculated from a known pressure gradient present in the porous medium by virtue of an applied pressure gradient or pressure wave and the velocity of the fluid in the rock pore space as measured by NMR. In contrast, in the present disclosure, AMNMR is used to distinguish between two types of fluids in the formation.

The acquisition of the NMR signals for the present disclosure uses standard prior art techniques. As discussed in U.S. Pat. No. 6,163,153 to Reiderman et al, having the same assignee as the present disclosure and the contents of which are incorporated herein by reference, RF pulses applied to the antenna coil of NMR apparatus include an initial RF pulse having a duration and amplitude which reorients the nuclear spin axes of the hydrogen nuclei in the earth formations so that they become substantially perpendicular to the direction of the static magnetic field induced by the magnet. This first RF pulse (hereafter "A-pulse" or "tipping pulse") is said to induce an angular deflection of about 90° in the spin axes of the hydrogen nuclei. Later in the measurement cycle known in the art, a sequence of additional RF pulses (referred to as "B-pulses" or "refocusing pulses"), each of these B-pulses having a duration and amplitude selected to reorient the extant nuclear spin axes by about 180°, is then applied to the antenna coil. In between B-pulses, the antenna coil is connected to a receiver circuit to detect voltages induced in the antenna coil as the nuclear spin axes "rephase", an event called the pulse-echo or spin echo. The combination of A-pulse and 180° B-pulses is known as a Carr-Purcell-Meiboom-Gill (CPMG) sequence. As is understood by those skilled in the art, the amplitude of the induced voltages from spin rephasing (pulse-echo voltages) decreases after each successive B-pulse applied to the antenna coil. The rate at which the amplitude of the successive pulse-echo voltages decays is related to properties of the earth formations such as fractional volume of pore space and the bulk volume of mobile fluids filling the pore space, as is known in the art.

Reiderman determined that the B-pulses can have a duration and amplitude selected to cause the nuclear spin axes to reorient by an angular deflection different from 180°, and showed that the average amplitude of the spin echoes is reduced only by about 30 percent (although the first and second echoes are reduced in amplitude substantially more than this) by reducing the flip angle of the B-pulses from 180° to 90°, corresponding to a 50% reduction in power requirement.

Figure 2A:
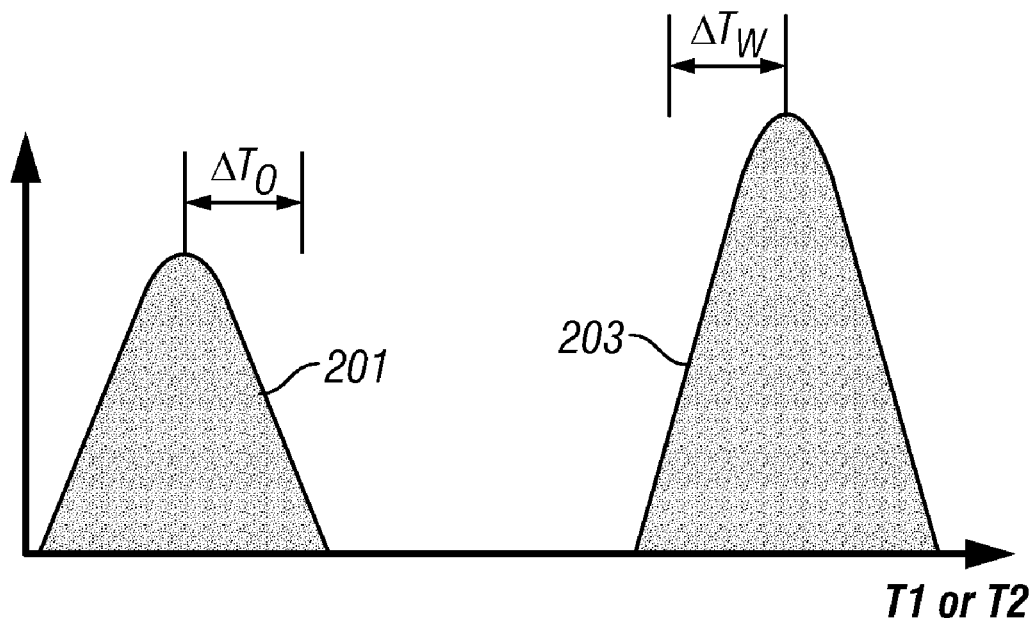
FIGS. 2A and 2B illustrate the concept of the present disclosure of using acoustic stimulation to alter the NMR distribution.
Figure 2B:
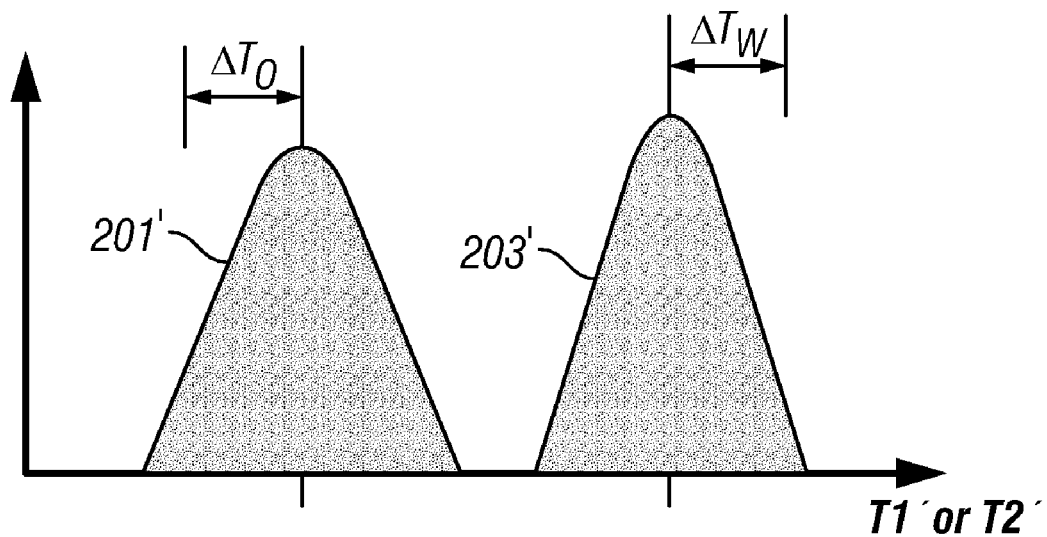

Following the acquisition of the pulse-echo signals, standard processing techniques are used to estimate a distribution of the transverse relaxation time $T_2$. In the present disclosure, an acoustic signal is applied and the NMR acquisition is repeated. After the application of an acoustic signal, the NMR relaxation of water and oil both as bulk fluids and in the porous media are modified. The alteration in the relaxation has been observed in a shift of the $T_2$ distribution towards higher $T_2$ times for oil and towards smaller $T_2$ times for water. This is schematically illustrated in FIG. 2A-B. Shown in FIG. 2A are distributions of $T_1$ (or $T_2$) 201 and 203 for oil and water respectively in the absence of an acoustic field. Shown in FIG. 2B are distributions of $T_1$ (or $T_2$) 201' and 203' for oil and water respectively in the presence of an acoustic field. As can be seen, there is a positive change $\Delta T_o$ in the peak of the relaxation time for oil, and a negative change $-\Delta T_w$ in the peak of the relaxation time for water. It is expected that the acoustic wave produces heating of the liquid in the pore spaces. This results in a drop of viscosity for hydrocarbons but as an increase of the water viscosity.

Figure 3:
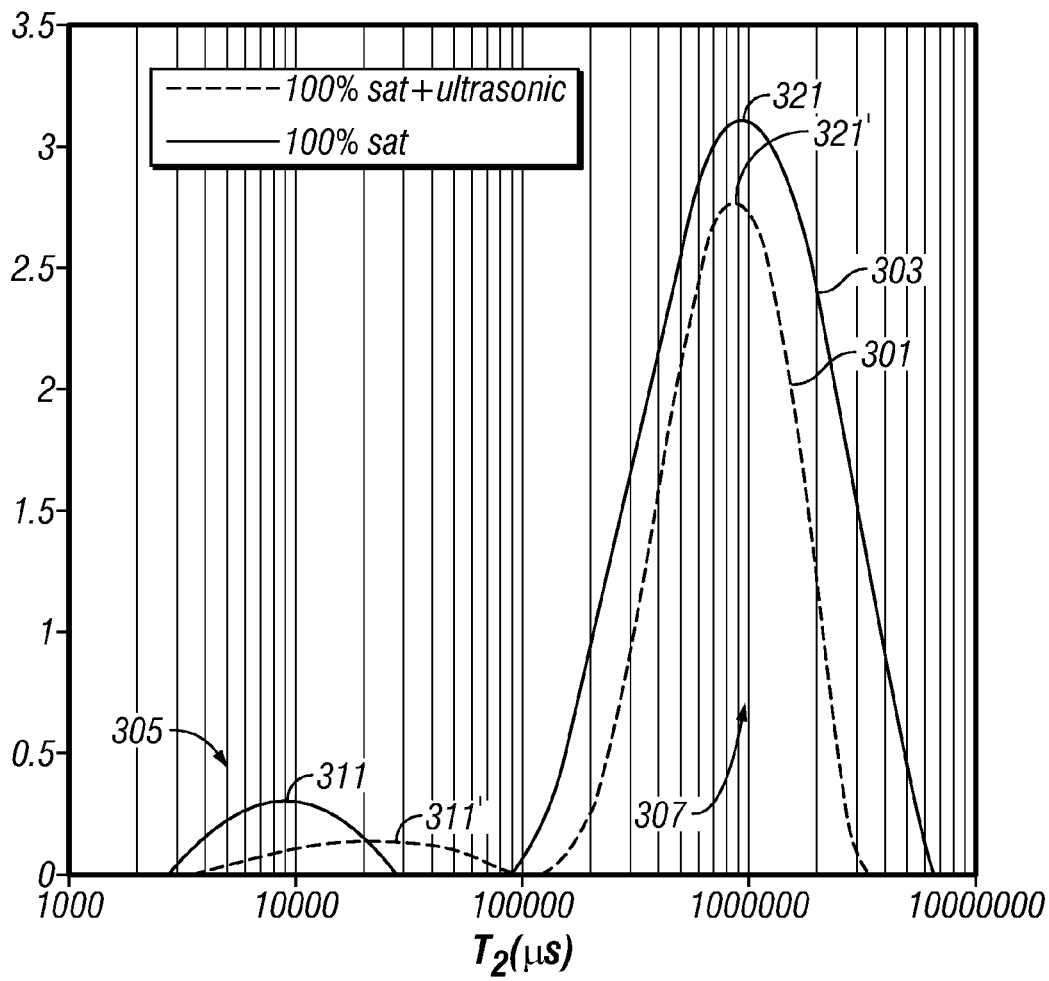
FIG. 3 shows actual measurements of $T_2$ on a core sample with and without acoustic stimulation.

This is illustrated in FIG. 3. The effect has been measured at 500 kHz and 1 MHz acoustic pulsed frequencies. Shown in FIG. 3 is a $T_2$ distribution obtained from NMR measurements in the absence of an ultrasonic field 301 and a $T_2$ distribution obtained in the presence of an ultrasonic field 303. Attention is drawn to the portion indicated by 305 where the location of the peak of the oil $T_2$ distribution moves to the right from 311 to 311', and to the portion indicated by 307 where the location of the peak of the water $T_2$ distribution moves to the left slightly from 321 to 321'. Because the measurements were not made in a confined sample, the difference in the areas under the two curves is attributed to escape of water from the pore spaces due to the heating produced by the acoustic wave. Although the effect has been detected at the above mentioned frequencies, it is expected to occur within a wide frequency range (dispersion effect) of the acoustic signals (pulsed or continuous). Experimentally, the AMNMR has been observed for the $T_2$ distribution (transversal relaxation), but it should be also present in the $T_1$ distribution (longitudinal relaxation) as well. The fact that water shows a shift of the $T_2$ distributions to lower $T_2$ times means that the formation becomes more water wet and hence the irreducible amount of water can be increased. The difference in areas under the two curves may also be due to the fact that the $T_2$ cutoff in the presence of the acoustic waves may not have been adequately sampled by the acquisition pulse sequence.

Figure 4:
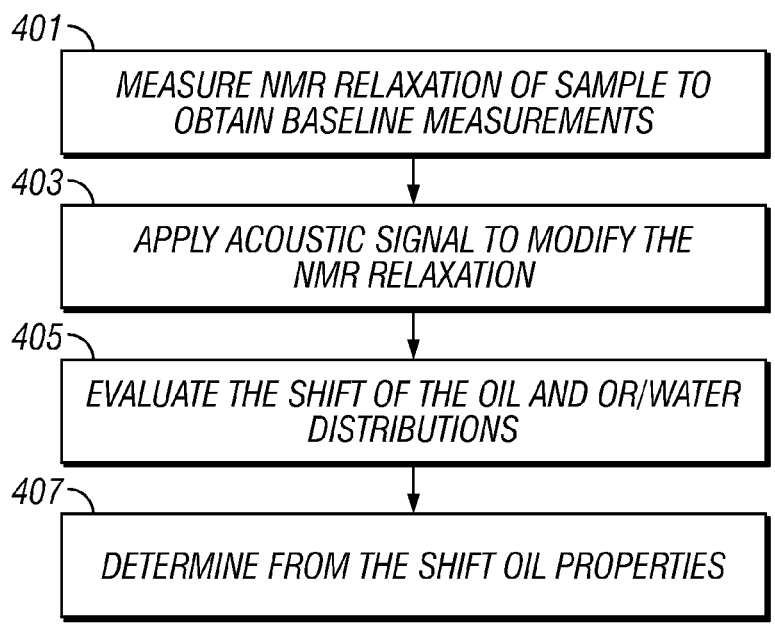
FIG. 4 is a flow chart illustrating some of the steps of the present disclosure.

The methodology to take advantage of the AMNMR procedure is summarized by the flow chart of FIG. 4. First 401, the NMR signals are measured in the absence of an acoustic signal to obtain baseline measurements. The signals are inverted to get $T_1$ or $T_2$ distributions. Next 403, an acoustic signal is applied to modify the NMR relaxation characteristics. The acoustic signal is selected in amplitude and frequency in order to modify the NMR relaxation of crude oil components or water. NMR signals are measured again and inverted to get modified $T_1$ or $T_2$ distributions. Next 405, the shift of the oil and/or water signals is determined. Finally, 407, using the differential shift of the signal, the oil volume is determined. Care should be taken to avoid overlapping of water and oil $T_1$ or $T_2$ distributions, which causes complications for evaluation of logs and NMR signals in general in the lower $T_1$ or $T_2$ values due to the presence of clay and capillary bound water. The measurements may be made using a logging tool of the type disclosed by Beard conveyed in a borehole in an earth formation. The NMR tool of Beard is a directional logging tool in the sense that the region of examination from which NMR signals originate is limited to an azimuthal sector around the tool.

An ultrasound source suitable for the present disclosure has been used in medical applications. It comprises a piezoceramic sandwich-transducer which initiates sound waves into water. For the present disclosure, sound waves are generated into the borehole fluid. The source is provided with a metallic horn that concentrates and amplifies the ultrasound energy. See Chilibon et al., (2005). An alternate embodiment of the disclosure uses a concave quartz crystal. The pressure variations along the axis of symmetry of such a concave crystal in a fluid are discussed in O'Neil (1949). These directional acoustic sources can provide focused acoustic waves in the region of examination.

Having the fluid components and the $T_2$ relaxation times gives a better picture of the makeup of the earth formation and the information gained can then be recorded on a suitable medium and used in development of the reservoir.

The disclosure above has used a wireline conveyed logging tool as an example. This is not to be construed as a limitation and a method can also be practiced using a tool conveyed on a bottomhole assembly on a drilling tubular. As is normal with logging tools, the measurements and the results of the processing may be stored on a suitable medium. Implicit in the processing of the data is the use of a computer program implemented on a suitable machine readable medium that enables the processor to perform the control and processing. The machine readable medium may include ROMs, EPROMs, EAROMs, Flash Memories and Optical disks.

What is claimed is:

1. A method of identifying a presence of two fluid components in an earth formation, the method comprising:
    acquiring a first nuclear magnetic resonance (NMR) signal from a region of examination of an earth formation, the first signal including a first distribution due to the first fluid component and a second distribution due to the second fluid component;
    generating an acoustic wave into the region of examination and acquiring a second NMR signal in the presence of the acoustic wave having a first shift of the first distribution and a second shift of the second distribution; and
    identifying the presence of the two fluids by using a difference between the first shift and the second shift.

2. The method of claim 1 wherein the two fluids comprise water and oil.

3. The method of claim 1 wherein acquiring the first NMR signal and the second NMR signal further comprises pulsing the earth formation using a pulse sequence including a tipping pulse having a tip angle substantially equal to 90° and a plurality of refocusing pulses with a tipping angle less than 180°.

4. The method of claim 1 wherein the first NMR signal and the second NMR signal comprise pulse-echo signals.

5. The method of claim 4 wherein identifying the presence of the two fluids further comprises inverting the first NMR signal and the second NMR signal to give a distribution of transverse relaxation times.

6. An apparatus configured to identify a presence of two fluid components in an earth formation, the apparatus comprising:
    a nuclear magnetic resonance (NMR) tool configured to acquire a first NMR signal from a region of examination of an earth formation including a first distribution due to the first component and a second distribution due to the second component, and
    a second NMR signal from the region of examination of the earth formation having a first shift of the first distribution, and a second shift of the second distribution due to the presence of an acoustic wave;
    an acoustic source configured to generate the acoustic wave during acquisition of the second NMR signal; and
    a processor configured to identify the presence of the two fluids using a difference between the first shift and the second shift.

7. The apparatus of claim 6 wherein the two fluids that the processor is configured to identify comprise water and oil.

8. The apparatus of claim 6 wherein the NMR tool is configured to acquire the first NMR signal and the second NMR signal by pulsing the earth formation using a pulse sequence including a tipping pulse having a tip angle substantially equal to 90° and a plurality of refocusing pulses with a tipping angle less than 180°.

9. The apparatus of claim 6 wherein the first NMR signal and the second NMR signal comprise pulse-echo signals.

10. The apparatus of claim 9 wherein the processor is further configured to identify the presence of the two fluids by inverting the first NMR signal and the second NMR signal to give distributions of transverse relaxation times.

11. The apparatus of claim 6 further comprising a conveyance device configured to convey the NMR tool into a borehole, the conveyance device selected from: (i) a wireline, and (ii) a drilling tubular.

12. A non-transitory computer-readable medium product having thereon instructions that when read by a processor cause the processor to execute a method, the method:
identifying a presence of two fluid components in an earth formation, using a difference between a first shift of a first distribution due to a first of the two fluid components between a first NMR signal acquired in the absence of an acoustic wave and a second NMR signal acquired in the presence of the acoustic wave and a second shift of a second distribution due to a second of the two fluid components between the first NMR signal and the second NMR signal.

13. The non-transitory computer-readable medium product of claim 12 further comprising at least one of: (i) a ROM, (ii) an EPROM, (iii) an EAROM, (iv) a flash memory, and (v) an optical disk.

* * * * *